United States Patent Office 2,877,990
Patented Mar. 17, 1959

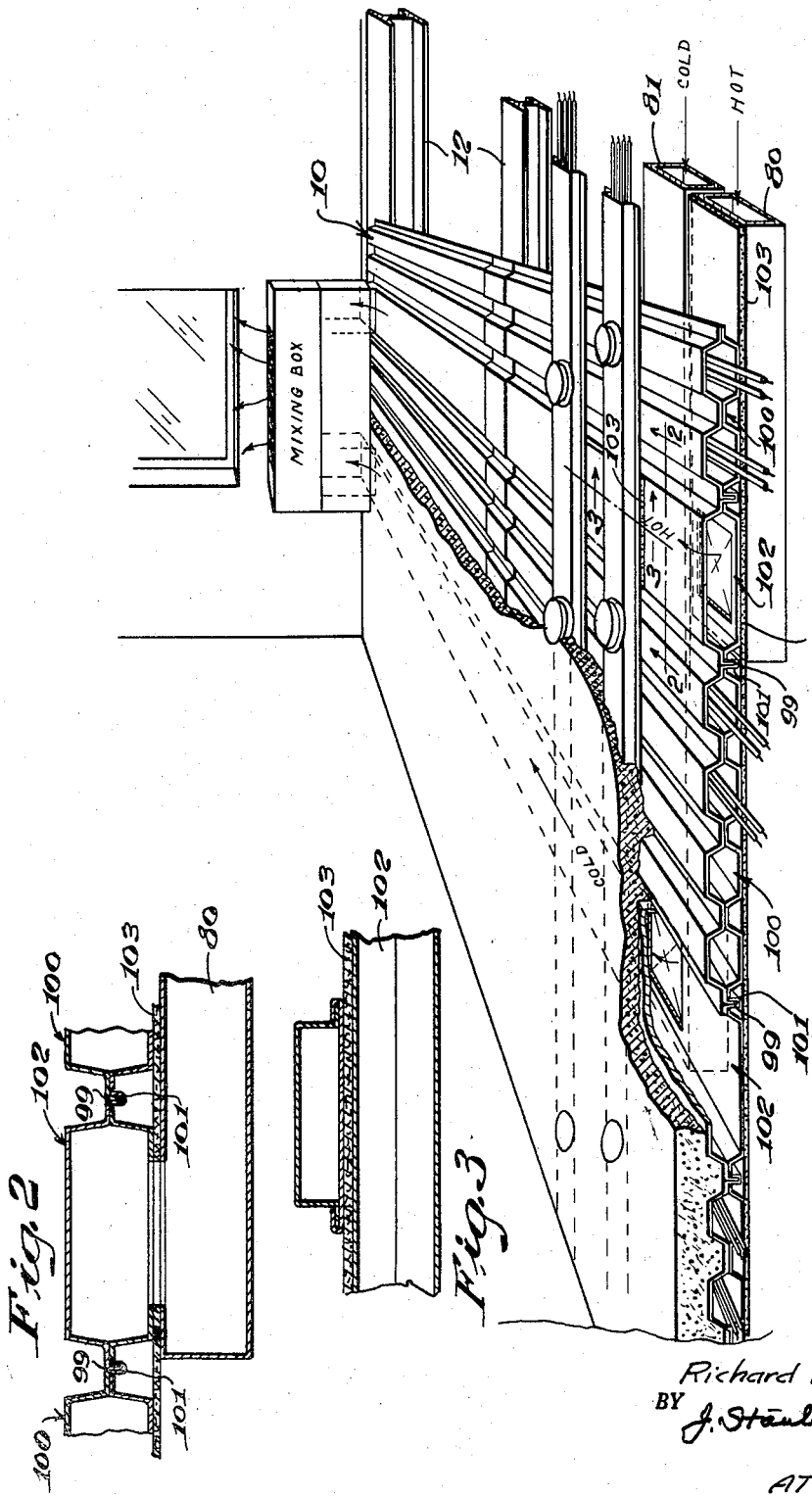

2,877,990

AIR CONDITIONING AND ELECTRICAL WIRE DISTRIBUTING STRUCTURE

Richard P. Goemann, Port Washington, N. Y., assignor to H. H. Robertson Company, Pittsburgh, Pa., a corporation of Pennsylvania Original application February 24, 1954, Serial No. 412,217, now Patent No. 2,729,429, dated January 3, 1956. Divided and this application December 9, 1955, Serial No. 552,016

1 Claim. (Cl. 257—8)

This invention relates to a novel building structure embodying a multi-cellular load supporting floor and a novel air distributing and electrical wiring system wherein both heated air and electrical wiring are distributed through selected of the cells of the floor.

In general the invention has for an object to provide a building structure of the character described wherein certain of the floor cells are utilized to conduct heated air, certain other floor cells are utilized as electrical wiring conduits and wherein crossover ducts for carrying heated air and for carrying electrical wiring may be provided extending transversely of and thermally insulated from the wiring and hot air cells of the floor to reduce to a minimum liability of damage to the insulation of the electrical wiring.

With this object in view and such others as may hereinafter appear, the invention consists in the novel building structure hereinafter described and particularly defined in the claim at the end of this specification.

In the drawings illustrating the preferred embodiment of the invention:

Fig. 1 is a perspective view of a portion of the air conditioning system showing the cellular floor embodying both air conducting cells and cells for distributing wiring for electrical service;

Fig. 2 is a cross sectional detail taken on line 2—2 of Fig. 1; and

Fig. 3 is a cross sectional detail view taken on the line 3—3 of Fig. 1.

In general the present invention contemplates a building structure wherein provision is made for distributing air through selected cells of a load supporting cellular floor and for distributing electrical service through other selected cells of said floor. Crossover ducts for carrying heated air and crossover ducts for electrical wiring are extended transversely of said floor cells, and provision is made for thermally insulating the hot air cells from the wiring crossover ducts or headers, and for thermally insulating the wiring floor cells from the crossover ducts or headers carrying the heated air.

The present invention is directed to a component of the complete multi-storied and air conditioned structure disclosed in my copending application, Serial No. 412,217, filed Feb. 24, 1954, now Patent No. 2,729,429, dated January 3, 1956, of which the present application is a division.

As more fully disclosed in application, Serial No. 412,217, the apparatus and system which has been illustrated as embodied in an air conditioning and an air distributing system, particularly in a multi-story building, may under varying conditions of operation serve the several purposes of ventilation, exhausting air from within the building, for heating a part or all of the building, for cooling a part or all of the building and for general air conditioning purposes. For convenience of description the apparatus and system will be at times referred to herein as an "air conditioning and distributing system."

The present invention may be embodied in a multi-story building in which provision is made for distributing air through a cellular load supporting floor structure in a novel manner such that economies in space between a particular floor at one story and the ceiling of the next story below may be effected, and as a result the framework of the building may be limited to the minimum height required to produce a predetermined number of stories of the building, each of a predetermined height from floor to ceiling.

The present air conditioning systems for multi-story buildings now on the market embody ducts at each floor where it is desired to effect the air conditioning. These ducts are of relatively large cross sectional dimension and occupy a substantial space when interposed between the floor and ceiling and are designed to conduct so-called "primary air" from a source of supply, usually located in the basement of the building through risers in the usual service core of the building and then through such relatively large distributing ducts between the ceiling and floor to specially designed outlet boxes usually disposed around the periphery of the building and below the windows of the building. These outlet boxes are usually provided with heating or cooling coils, and in the operation of such systems the air within the building or within the particular room or portion of the building in which the sill boxes are located is caused to circulate through the sill boxes by induction caused by the flow of primary air through a special orifice or device in the sill box. In other words the prior art systems all embody at each story, air ducts running beneath the floor and between it and the ceiling of the story below, and the successful operation of the system depends upon the conditioning of the air in the sill boxes and the induction of the proper amount of air from within the room or portion of the building in which the sill box is located. Such an air distribution system in addition to the elaborate duct system and the height which is wasted by the ducts between the ceiling and the floor, as described, not only is less efficient in operation but also requires the distribution of water to the individual sill boxes from a source in the service core requiring a more or less tailor-made installation depending upon the location of the individual sill boxes and their distance from the service core. Such systems leave much to be desired in the way of flexibility and cost.

In general the present system seeks to eliminate the waste space above referred to between the ceiling and the floor in a multi-story building which, as stated, is required by the ducts of prior art air conditioning systems. This is accomplished by utilizing a cellular floor, such as that illustrated in the United States patent to Young, above referred to, as a component of the present air conditioning and distribution system by which both hot and cold air or by which cool air in different volumes or in different degrees of conditioning, or for heating or cooling purposes may be distributed in an economical, highly flexible and superior manner to outlets disposed not only around the periphery of the building but also at selected intermediate locations, and which may discharge either into the building upwardly through suitable outlet boxes or downwardly through ceiling outlets into the story next below.

Referring to the drawings and particularly to Fig. 1 which illustrates in perspective a sufficient portion of one of the floors in a multi-story building embodying the present air conditioning and wire distributing system to enable the invention to be understood, 10 represents a cellular metal load supporting floor structure supported upon girders 12 wherein the standard cellular unit 100 of the floor illustrated in the Young patent above referred to comprises four cells of similar contour, and it is preferred to erect the floor utilizing with alternate cellular units 100 a series of units 102 having a single enlarged cell of a sectional dimension such as to conduct a relatively large volume of air therethrough. This cell unit 102 is preferably of a width equal to one-half the width of a standard unit 100 and is preferably constructed with male and female lips 99, 101 at the margins thereof for cooperation with corresponding lips on the margins of the standard units 100 to form the load supporting floor.

In the preferred construction of the floor for the embodiment in a multi-story building embodying the invention the enlarged air carrying cellular units 102 are erected in alternate relation to the standard units. In accordance with the present invention the electrical wiring services may and preferably will be carried through selected of the standard cell units 100. In order that the electrical service may be carried to any desired locations or outlets in the building, crossover ducts provided with any usual type of access openings and/or service outlets, not shown, may be disposed transversely of the cell units 100, 102, and preferably upon the upper surface of the floor cells, as shown.

In practice hot and cold air header ducts 80, 81 are provided for conducting volumes of hot and cold air from a supply thereof to the hot and cold air conducting cells 102 respectively. As illustrated in Fig. 1, the header ducts 80, 81 may be and preferably are disposed beneath and transversely of the cell units 100, 102, the hot air header 80 extending across cell units 100 and communicating with hot air cell unit 102 and the cold air header 81 extending across cell units 100, hot air cell 102 and communicating with the cold air cell 102, as shown.

In accordance with the present invention provision is made for insulating the wiring cells 100 from the hot air floor cells and also for insulating crossover hot air ducts from the wire carrying floor cells to prevent excessive heating of the wiring. In practice it is well known that whenever a plurality of electrical wires are confined within a conduit, in this instance a cell unit 100, the inherent resistance of the wires to the flow of electricity creates an amount of heat, and this coupled with the additional heat which may be transmitted to the wires from the hot air conducting cells and headers is likely to have a detrimental, damaging effect upon the wiring insulation with accompanying damage to the electrical service in the building. In order to reduce such liability to a minimum a sheet of insulation 103 of substantial thickness is provided between the top of each hot air conducting cell 102 and the wiring crossover duct, as best shown in Figs. 1 and 3, and another similar sheet of insulation is provided between the wiring cells 100 and the underlying hot air headers 80. In this manner the transmission of heat from the hot air cells 102 and headers 80 to the wires contained in and carried by the cells 100 and crossover ducts is reduced to a minimum and liability of damage to the electrical service may be substantially eliminated.

Having thus described the invention, what is claimed is:

In a building and air conditioning system, a cellular load supporting floor providing a series of metal wire-carrying cells and a series of metal air-carrying cells disposed in a common horizontal plane and including separate hot and cold air-carrying cells; air discharge outlets communicating with said air-carrying cells; means for supplying air to the air-carrying cells, including metal hot and cold air-carrying supply ducts having surfaces disposed in juxtaposed relation below the surface of and extending transversely of said air-carrying and wire-carrying cells and communicating with said hot and cold air-carrying cells, respectively; wire-carrying crossover ducts extended transversely across and having surfaces disposed in juxtaposed relation above the upper surface of said air and wire-carrying cells; a concrete floor fill covering said metal load supporting floor; thermal insulating material interposed between the juxtaposed surfaces of said wire-carrying cells and said hot air supply duct, and thermal insulating material interposed between the juxtaposed surfaces of the hot air-carrying cells and the wire-carrying crossover ducts, whereby to minimize heat transfer from said hot air supply duct to said wire-carrying cells and from said hot air-carrying cells to said wire-carrying crossover ducts, thus preventing the wire-carrying crossover ducts from acting as a path of heat transmission between the hot air supply duct and the wire-carrying crossover ducts.

References Cited in the file of this patent
UNITED STATES PATENTS

| | | |
|---|---|---|
| 1,974,767 | Clark | Sept. 25, 1934 |
| 2,125,366 | Young et al. | Aug. 2, 1938 |
| 2,182,686 | Young | Dec. 5, 1939 |
| 2,445,197 | Wiesmann | July 13, 1948 |
| 2,672,749 | Wiesmann | Mar. 23, 1954 |
| 2,741,117 | Hoseason | Apr. 10, 1956 |